Jan. 30, 1962     F. C. HUNT ETAL     3,018,541
ARMATURE ASSEMBLY AND METHOD OF MAKING THE SAME
Filed May 11, 1956     3 Sheets-Sheet 1

*INVENTORS*
FREDERICK C. HUNT
EDWARD P. KLEIN
BY
George W. Price
*ATTORNEY*

Jan. 30, 1962 F. C. HUNT ETAL 3,018,541
ARMATURE ASSEMBLY AND METHOD OF MAKING THE SAME
Filed May 11, 1956 3 Sheets-Sheet 2

INVENTORS
FREDERICK C. HUNT
EDWARD P. KLEIN
BY
George W. Price
ATTORNEY

Jan. 30, 1962     F. C. HUNT ETAL     3,018,541
ARMATURE ASSEMBLY AND METHOD OF MAKING THE SAME
Filed May 11, 1956     3 Sheets-Sheet 3

INVENTORS
FREDERICK C. HUNT
EDWARD P. KLEIN

United States Patent Office 3,018,541
Patented Jan. 30, 1962

3,018,541
ARMATURE ASSEMBLY AND METHOD
OF MAKING THE SAME
Frederick C. Hunt, East Dennis, and Edward P. Klein, Cambridge, Mass., assignors, by mesne assignments, to Ling-Temco Electronics, Inc., a corporation of Delaware
Filed May 11, 1956, Ser. No. 584,273
6 Claims. (Cl. 29—155.56)

This invention relates to reciprocating electrodynamic vibration apparatus and more particularly to improvements in armature assemblies for such apparatus.

Electrodynamic apparatus of this general type is shown and described in United States Letters Patent No. 2,599,036 to Efromson and Lewis wherein the current carrying armature coil is joined by means of mechanical fasteners to the elongated struts of the armature supporting structure which extend through the magnetic core structure. It has been subsequently found that the armature of the type shown in the aforementioned patent is improved by eliminating such comparatively complicated and expensive fasteners and substituting therefor simple resin adhesive bonded joints. However, when the armature coil is similarly bonded to the webs of rigid armature structures, such as required in the high performance electrodynamic apparatus of the type shown in Zerigian's copending application Serial No. 558,922, filed January 13, 1956, now United States Letters Patent No. 2,846,598 the bond is found to be the limiting factor in the output which can be obtained, and if the electrical currents carried by the coil and the output forces generated thereby are not severely curtailed, cracking due to the large differential expansion between the heated armature coil and the relatively cool rigid supporting structure occurs at the bonded joints. Thus the tensile strength of the bonded joint becomes the controlling limitation as to the maximum permissible current flow and the maximum useful output of the armature structure. Failure of the attachment in shear due to softening at elevated temperature can be controlled adequately by selection of suitable compounds for the bonding agent.

It is, accordingly, the objects of this invention to provide means for bonding an armature coil to a rigid supporting structure, which is not limited by the large differential expansion and resulting tensile failure of the bonded joint, which also does not act as the controlling factor limiting the maximum allowable current flow in the armature coil and the maximum force output from the armature and which advances the art generally.

The above objects are obtained in the present invention by maintaining the bonded joints between the armature coil and the rigid supporting structure under a compressive or low tensile stress throughout the normal operating range of the assembly, thereby to take advantage of the greater compressive strength possessed by adhesive compounds, particularly compounds of the epoxy resin type. The method we have found preferable to obtain such pre-stressed compressive bonded joints comprises the steps of concentrically arranging the coil with respect to its rigid supporting structure and causing a relative temperature differential between the coil and the support so that the clearances therebetween are increased. This temperature differential is at least the maximum which can be normally expected to be encountered under the most extreme operating conditions. Such temperature differential may be obtained among other ways by passing either a direct or alternating current through the armature coil to raise the temperature thereof and preferably simultaneously blowing cooling air over the armature supporting structure to maintain it near ambient temperature. The coil and structure are temporarily secured either by a special fixture or shims to maintain substantially equal clearances therebetween, and an adhesive compound is flowed into the expanded clearances. The flow of current through the coil or other differential temperature creating means is maintained until the resin compound is cured. The subsequent cooling of the coil results in a contraction of the circumference thereof and places the adhesive compound under a compressive stress. Heating of the coil under the influence of operating currents will cause coil expansion which unloads the compressive stress on the bonded joint, leaving it slightly in compression, or under a tension much lower than would exist without this treatment.

These and other objects and aspects of the invention will be apparent from the following description of a specific embodiment of our invention which refers to drawings wherein.

Figure 1:
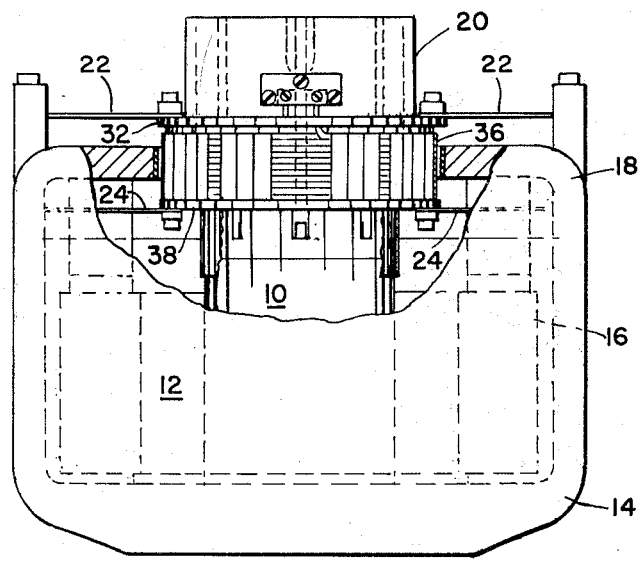
FIG. 1 is an elevation view of a reciprocating electrodynamic machine with a portion of the core structure broken away to show the armature assembly.

The reciprocating electrodynamic machine in FIG. 1 comprises a magnetic core structure of low reluctance material which includes a cylindrically shaped central pole piece 10 arranged in concentric relationship with respect to an outer cylindrical ring such as the shell 12 by a lower end piece 14. A direct current magnetizing field winding 16 is disposed within the cavity formed by the pole piece 10, the shell 12 and the end piece 14 so that the coil encircles the pole piece and is enclosed within the shell. The top of the core structure is closed by an upper end piece 18 with a central aperture the diameter of which is greater than the diameter of the pole piece so that a cylindrical air gap in the magnetic circuit is formed therebetween. Upon the energization of the field winding 16 by a direct current a strong unidirectional flux is established in the magnetic circuit of the core structure consisting of the central pole piece 10, the lower end piece 14, the shell 12, and the upper end piece 18 which magnetic circuit is completed across the cylindrical air gap.

As is described more fully in the aforementioned Zerigian application, the upper end of the central pole piece 10 is provided with a central axial recess outwardly from which radially extend eight equally spaced slots so that the upper end of the cap is divided into eight pie-shaped finger-like sectors. This distinctive configuration permits the end of the pole piece 10 to receive in its slots, the corresponding web members of an armature assembly 20 which will be described in detail hereinafter. As is also set forth and claimed in the Zerigian application, the armature assembly 20 may be supported with freedom of movement in an axial direction by four equally spaced pairs of flexures each of which pairs consists respectively of an upper flexure 22 and a lower flexure 24, it being understood, however, that the present invention as set forth in the appended claims is not limited to the details of either the core structure or flexures as described above.

Figures 2, 3, 4:
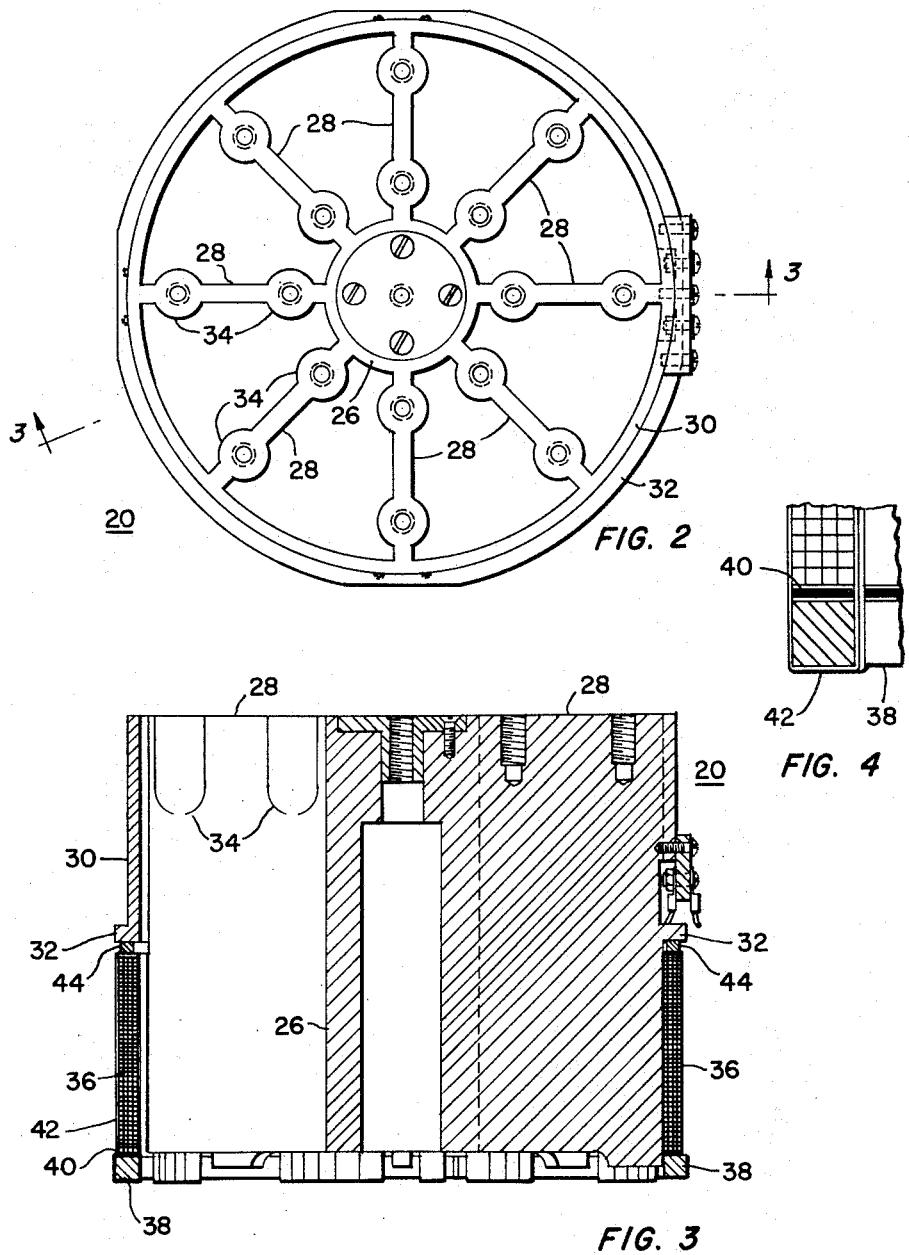
FIG. 2 is an enlarged plan view of the armature assembly.
FIG. 3 is a sectional view on line 3—3 of FIG. 2.
FIG. 4 is an enlarged fragmentary sectional view showing the details of the end ring connection.
Figure 5:
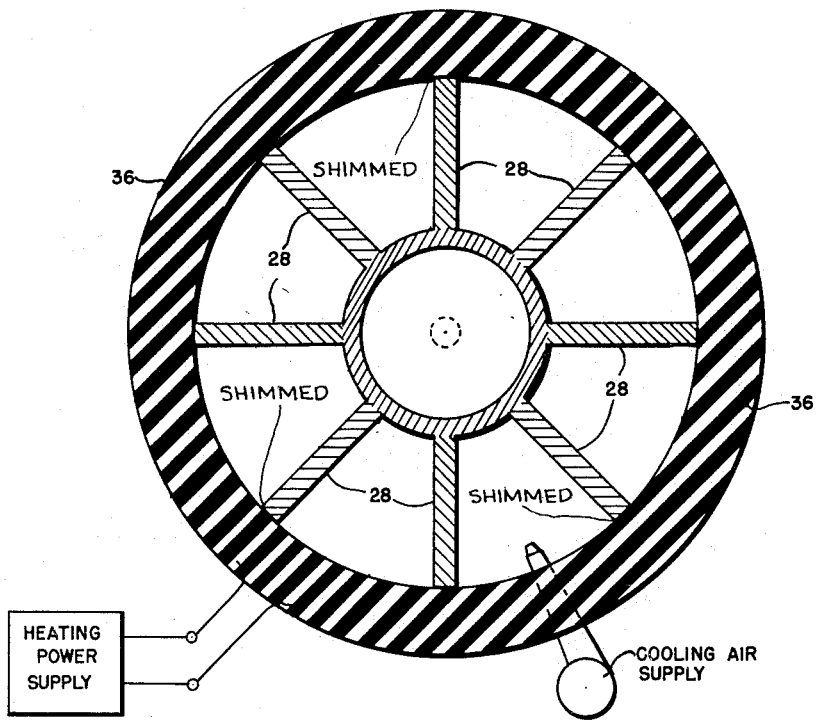
FIG. 5 is a sectional view of the armature illustrating the heating power supply and the cooling air supply therefor.
Figure 6:
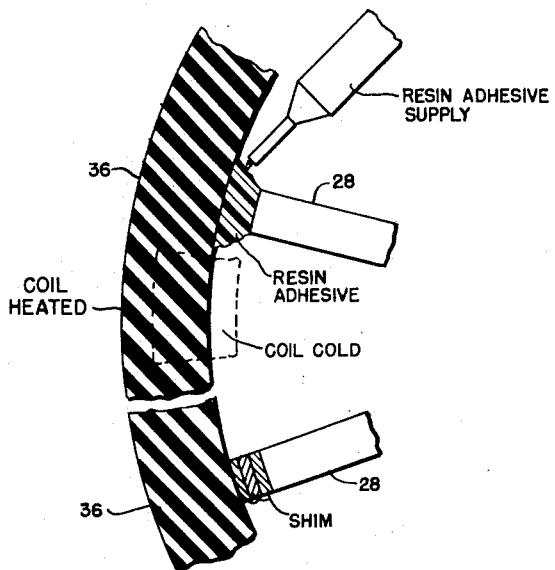
FIG. 6 is a fragmentary sectional view of the armature coil and spider illustrating the manner of applying the resin adhesive.

As is shown in FIGS. 2 and 3, the armature assembly 20 comprises a supporting spider cast of aluminum or other light weight material consisting of a hollow central hub or stem 26 outwardly from which extend eight equally spaced web members 28. The outer ends of the top half of the web members 28 are connected by an integrally cast ring 30 terminating in an annular flange 32 to which the ends of the above-mentioned upper flexures 22 (FIG. 1) are attached. The upper end of each of the web members 28 is provided with two bosses 34 having threaded recesses for connecting the assembly to a test load (not shown).

A reciprocating movement is imparted to the armature assembly 20 by the interaction of the alternating magnetic field associated with an alternating current coil 36 carried by the armature assembly with the unidirectional magnetic field established across the cylindrical air gap of the core structure by the flow of direct current through the field winding 16. The coil 36 is wound on a conventional mandrel of a plurality of turns of insulated wire which are coated with a liquid adhesive compound such as a suitable epoxy potting compound with an amine hardener. Although our invention is not limited thereto, we have found that good results are obtained by using a mixture of the following materials which are sold under the trade name "Hysol" by Houghton Laboratories, Inc. of Olean, N.Y.:

1.0 part by volume of Hysol resin XL-6053.
1.0 part by volume of Hysol hardener XL-BC.
½% by weight of Hysol accelerator XE-BD of the total weight or resin and hardener.

Other commercially available resin adhesive compounds can be used, for example, Bondmaster M620 made by Rubber and Asbestos Corporation of Bloomfield, N.J., or a mixture of 37% of Dow Corning R-7501 with 63% Neo Novacite Filler made by Malvern Mineral Products, Hot Springs, Ark.

After the bonding material has been cured until the coil is self-supporting a split end ring 38 is bonded thereto to provide an anchor for the ends of the lower flexures 24 (FIG. 1). Before being bonded to the coil 36, the end ring 38 is bonded to a glass cloth ring 40 which is impregnated with an internally plasticized epoxy resin formulation with an amine hardener system and an inorganic filler such as a metallic oxide or silica. Such an adhesive compound may be obtained from Chemical Research and Development Laboratory of Belmont, Mass. under the trade designation "Formulation T-120-3." The same adhesive compound is used to bond the end ring 38 and glass cloth ring 40 to the lower end of the coil 36 and a layer of glass cloth tape 42 wrapped around both the ring and the coil except adjacent the circumferential spaces corresponding to the positions of the spider web members 28 and the flexures 24. The tape 42 is then impregnated with the "Hysol" mixture described above. An expansion ring 44 whose function will be described below, is then bonded to the bottom surface of the annular flange 32 by means of the T-120-3 formulation or its equivalent and the assembly baked in an oven for one hour at 100° C. to cure the adhesive compound.

After cooling to ambient temperature, the assembly of the glass tape wound coil 36 and end ring 38 is dropped over the lower half of the armature spider web members 28, which have been turned with a moderately coarse finish to a diameter somewhat smaller than the inner diameter of the coil to the position shown in FIG. 3. Prior to the positioning of the coil 36 the expansion ring 44 is coated with T-120-3 adhesive compound so that the end of the coil is bonded thereto.

An electric current, either A.C. or D.C., is then passed through the coil 36 to raise the temperature thereof to a temperature corresponding to the highest which would be encountered under the most severe anticipated operating conditions of the associated electrodynamic machine. The above-described electrical heating of the coil 36 causes an expansion correspondingly increasing the diameter thereof so that the clearance between the outer ends of the web members 28 and the inner surface of the coil is increased. The armature spider is maintained at near ambient temperature by the passing of cooling air lengthwise of the web members 28. Preferably, the clearance between the diameter of the armature spider web members 28 and the inner diameter of the coil 36 is made such at ambient temperature as to result in approximately a 50% increase of the average clearance when the coil is raised to its operating temperature as set forth above. For example, we have found that with a coil of approximately 8½" in mean diameter which is supported by web members 28 of ¼" thickness, a clearance between the end of each web member and the inner surface of the coil of 1/64" when the coil is cold, and of .023 when the coil is expanded, to be satisfactory. With webs of greater thickness, it is necessary to increase the clearances. For example, a larger armature assembly having webs of 1" thickness will require clearances in the order of 1/16" with the coil expanded. In any case, the clearance should be great enough to permit the flow of the comparatively pasty adhesive compound therethrough and to permit a thickness of the resulting bonded joints which will accommodate the differential strain imposed by the differences of expansion of the coil 36 and supporting structure without cracking or breaking.

Before the bonded joints are made, the coil 36 is centered with respect to the spider and clamped either by a suitable fixture or by shims which are interposed between the coil and the ends of several of the web members. With the electrical current continuing to circulate through the coil T-120-3 formulation adhesive compound is then flowed into the clearances between the coil 36 and web members 28 which are not shimmed. The compound is forced through from one side of each of the web members 28 to insure that there is no entrapment of air in the resulting bonded joint. After the compound has cured sufficiently to support the coil 36, the shims are removed and the remaining joints are completed. The excess compound is removed and fillets having a radius between 1/16" and ⅛" are built up at all edges of the joints. The adhesive compound is then cured by continuing the current flow of two additional hours.

By forming the bonded joints between the ends of the web members 28 and the coil 36 under conditions corresponding to the maximum operating conditions which are encountered during service, the bonded joints are prestressed so that they are under compression rather than being subjected to tensile force, thereby employing the most favorable characteristic of the compound, i.e., its compressive strength. Flexibility in the bonded joint between the upper end of the coil 36 and the annular flange 32 does not depend upon pre-stressing of the bonding adhesive compound as in the web member joints as described above, but upon the resiliency of the precast expansion ring 44.

We have found that by fabricating an armature assembly according to the method described above, the resulting structure has a very high resonant frequency and the current flow through the coil and the developed output forces are not severely limited by the cracking or rupturing of the bonded joints. For example, an armature assembly with an 8½" diameter will be able, when fabricated as above, deliver a vibrating force of plus or minus 600 lbs. and have a first resonant frequency in the vicinity of 4800 to 5200 cps.

It should be understood that the present disclosure is for the purpose of illustration only and that this invention includes all modifications and equivalents which fall within the scope of the appended claims.

We claim:

1. The process of bonding a current carrying coil to a rigid supporting structure to form a unitary assembly comprising the steps of concentrically arranging the coil with respect to the supporting structure, causing a relative temperature differential between the coil and the supporting structure to expand the clearance therebetween to at least those encountered at the maximum operating temperature of the assembly, securing the coil with respect to the supporting structure to maintain substantially equal clearances therebetween, flowing an adhesive resin compound into the expanded clearances between the coil and the structure to form a bond therebetween, and maintaining the relative temperature differential until the adhesive resin compound is cured.

2. The process of bonding a current carrying coil to a rigid supporting structure to form a unitary assembly comprising the steps of concentrically arranging the coil with respect to the supporting structure, elevating the temperature of the coil relatively to the supporting structure to expand the clearances therebetween to at least those encountered at the maximum operating temperature of the assembly, securing the coil with respect to the supporting structure to maintain substantially equal clearances therebetween, flowing an adhesive resin compound into the expanded clearances between the coil and the structure to form a bond therebetween, and maintaining the elevated temperature until the adhesive resin compound is cured.

3. The process of bonding a current carrying coil to a rigid supporting structure to form a unitary assembly comprising the steps of concentrically arranging the coil with respect to the supporting structure, raising the temperature of the coil and concurrently lowering the temperature of the supporting structure to expand the clearances therebetween to at least that encountered at the maximum operating temperature of the assembly, securing the coil with respect to the supporting structure to maintain substantially equal clearances therebetween, flowing an adhesive resin compound into the expanded clearances between the coil and the structure to form a bond therebetween, and maintaining the elevated temperature until the adhesive resin compound is cured.

4. The process of bonding a current carrying coil to a rigid supporting structure to form a unitary assembly comprising the steps of concentrically arranging the coil with respect to the supporting structure, causing an electric current to flow through the coil to raise the temperature relatively to the supporting structure, thus expanding the clearances therebetween to at least that encountered at the maximum operating temperature of the assembly, securing the coil with respect to the supporting structure to maintain substantially equal clearances therebetween, flowing an adhesive resin compound into the expanded clearances between the coil and the structure to form a bond therebetween, and maintaining the current flowing through the coil until the adhesive resin compound is cured.

5. The process of bonding a current carrying coil to the radially extending web members of a rigid supporting structure to form a unitary assembly comprising the steps of concentrically arranging the coil with respect to the supporting structure, causing an electric current to flow through the coil to raise the temperature relatively to the supporting structure, thus expanding the clearances between the coil and the ends of the web members to at least that encountered at the maximum operating temperature of the assembly, securing the coil with respect to the supporting structure to maintain substantially equal clearances therebetween, flowing an adhesive resin compound into the expanded clearances between the coil and each of the members from one side thereof to form a bond therebetween, and maintaining the current flowing through the coil until the adhesive resin compound is cured.

6. The process of bonding a current carrying coil to the radially extending web members of a rigid supporting structure to form a unitary assembly comprising the steps of concentrically arranging the coil with respect to the supporting structure, causing an electric current to flow through the coil to raise the temperature relatively to the supporting structure thus expanding the clearances between the coil and the ends of the web members to at least that encountered at the maximum operating temperature of the assembly, inserting shims between the coil and the ends of several of the web members for maintaining substantially equal clearances therebetween, flowing an adhesive resin compound into the expanded clearances between the coil and the ends of the web members not supplied with shims to form a bond therebetween, removing the shims, flowing adhesive resin compound into the clearances from which the shims are removed, and maintaining the current flowing through the coil until the adhesive resin compound is cured.

References Cited in the file of this patent
UNITED STATES PATENTS

| | | |
|---|---|---|
| 2,118,862 | Rayment et al. | May 31, 1938 |
| 2,594,096 | Trigg | Apr. 22, 1952 |
| 2,668,925 | Bloser | Feb. 9, 1954 |
| 2,846,598 | Zerigian | Aug. 5, 1958 |

FOREIGN PATENTS

| | | |
|---|---|---|
| 673,793 | Great Britain | June 11, 1952 |